US012293887B2

(12) United States Patent
Berard et al.

(10) Patent No.: US 12,293,887 B2
(45) Date of Patent: May 6, 2025

(54) CIRCUIT BREAKER COMPRISING AN IMPROVED LINKAGE MECHANISM

(71) Applicant: General Electric Technology GmbH, Baden (CH)

(72) Inventors: David Berard, Villeurbanne (FR); Quentin Dominique Louis Rognard, Villeurbanne (FR); Jérôme Laurent, Villeurbanne (FR); Serge Bachelard, Villeurbanne (FR)

(73) Assignee: GE INFRASCRUCTURE TECHNOLOGY LLG, Greenville, SC (US)

( * ) Notice: Subject to any disclaimer, the term of this patent is extended or adjusted under 35 U.S.C. 154(b) by 183 days.

(21) Appl. No.: 18/249,366

(22) PCT Filed: Oct. 18, 2021

(86) PCT No.: PCT/EP2021/078782
§ 371 (c)(1),
(2) Date: Apr. 17, 2023

(87) PCT Pub. No.: WO2022/084237
PCT Pub. Date: Apr. 28, 2022

(65) Prior Publication Data
US 2023/0386762 A1 Nov. 30, 2023

(30) Foreign Application Priority Data
Oct. 19, 2020 (EP) .................................... 20202630

(51) Int. Cl.
*H01H 3/46* (2006.01)
*H01H 1/36* (2006.01)

(52) U.S. Cl.
CPC ................ *H01H 3/46* (2013.01); *H01H 1/36* (2013.01)

(58) Field of Classification Search
CPC .. H01H 3/46; H01H 1/36; H01H 3/42; H01H 33/42; H01H 2033/028
(Continued)

(56) References Cited

U.S. PATENT DOCUMENTS

| | | | | |
|---|---|---|---|---|
| 9,543,081 | B2 | 1/2017 | Ozil et al. | |
| 9,748,059 | B2 * | 8/2017 | Cernat ................. | H01H 33/025 |
| 12,033,817 | B2 * | 7/2024 | Rognard .............. | H01H 33/021 |

FOREIGN PATENT DOCUMENTS

| | | | |
|---|---|---|---|
| DE | 10013233 | A1 | 10/2001 |
| DE | 10054554 | A1 | 5/2002 |
| WO | 9832142 | A1 | 7/1998 |

OTHER PUBLICATIONS

International Search Report and Written Opinion in PCT/EP2021/078782 dated Jan. 31, 2022 (10 pages).

(Continued)

*Primary Examiner* — Lheiren Mae A Caroc
(74) *Attorney, Agent, or Firm* — Eversheds-Sutherland (US) LLP

(57) ABSTRACT

The present application concerns a circuit breaker including a movable contact, a driving rod slidably mounted in the circuit breaker, a linkage mechanism for driving the movable contact, a pivoted driving fork rotatably mounted in the circuit breaker which cooperates with the driving rod through the cooperation of a primary pin provided on the driving rod and a primary slot provided on the driving fork, a driven lever connecting the driving fork to the movable contact, and wherein the driving rod supports a secondary pin which cooperates with a secondary slot of the driving fork when the driving rod in a position between a predetermined position and an extreme opened position of the circuit breaker.

12 Claims, 3 Drawing Sheets

(58) Field of Classification Search
USPC .................. 218/7, 14, 92, 93, 78, 140, 154; 200/252, 337
See application file for complete search history.

(56) References Cited

OTHER PUBLICATIONS

Extended European Search Report in EP 20202630.8 dated Apr. 6, 2021 (8 pages).

* cited by examiner

CIRCUIT BREAKER COMPRISING AN IMPROVED LINKAGE MECHANISM

TECHNICAL FIELD

The invention concerns a circuit breaker comprising a single movable contact and an improved mechanism for linking the movable contact to a driving rod.

PRIOR ART

Non-linear double-motion high-voltage (HV) circuit breakers are well-known.

The document U.S. Pat. No. 9,543,081 discloses such a circuit breaker. It comprises two movable contacts that move in opposite directions to break the circuit. The primary movable contact comprises a tulip, a nozzle and contact cylinder attached together, while the secondary movable contact comprises a pin and a counter-contact cylinder attached together. A non-linear motion linkage mechanism transforms the movement of the primary movable contact in one direction into non-linear movement of the secondary movable contact in the opposite direction. In this way, the circuit breaker is able to break a circuit.

However, moving the various components of the circuit breaker consumes a lot of energy, as they are heavy, yet need sufficient acceleration and speed for the disconnection. On top of that, this circuit breaker has numerous moving parts, which makes it more susceptible in general to mechanical failure. Finally, it is also expensive, as certain components such as the contact cylinder and counter-contact cylinder, have to be coated in silver, so as to possess the required hardness and conductivity in order to assure proper functioning.

Document WO-9832142 discloses a simplified circuit breaker comprising a single moving contact.

According to this document, the moving contact is linked to the driving rod by a driving fork and a pin and slot connection.

The design of the slot allows a nonlinear movement of the movable contact, more particularly to have a high speed of the movable contact while the electric contact is broken.

Also, after the separation of the moving contact from an associated tulip-shaped movable contact, the pin exits from the slot, to stop the motion of the moving contact despite the motion of the driving rod.

Due to the absence of cooperation of the pin with the slot, it is possible that the movable contact moves towards the tulip-shaped contact, even if the driving rod doesn't move.

The object of the invention is to provide a circuit breaker comprising means ensuring that the movable contact remains steady in an opened position of the circuit breaker.

BRIEF DESCRIPTION OF THE INVENTION

The invention concerns a circuit breaker comprising a movable contact slidingly mounted in the circuit breaker along a main axis A of the circuit breaker and comprising at least one driving rod slidably mounted in the circuit breaker along said main axis A,

- a linkage mechanism for driving the movable contact in a non-linear movement, comprising:
- a pivoted driving fork rotatably mounted in the circuit breaker along a secondary axis B perpendicular to said main axis A, which driving fork cooperates with the driving rod through the cooperation of a primary pin provided on the driving rod and a primary slot provided on the driving fork,
- a driven lever connecting the driving fork to the movable contact,
- wherein the driving rod supports a secondary pin which is intended to cooperate with a secondary slot of the driving fork when the driving rod in a position between a predetermined position, in which the movable contact is disconnected from an associated contact and an extreme opened position of the circuit breaker.

Preferably, the secondary pin is slidably mounted on the driving rod and cooperates with an elastic component urging the secondary pin towards the driving fork.

Preferably, an end of the elastic component is linked to the secondary pin and the other end of the elastic component is stationary in the circuit breaker.

Preferably, an end of the elastic component is linked to the secondary pin and the other end of the elastic component is linked to the primary pin.

Preferably, a sleeve is mounted on the driving rod and is fixed to the primary pin, extending towards the secondary pin.

Preferably, the secondary pin is slidably mounted on the driving rod and wherein the driving fork comprises a third slot receiving the secondary pin to move the secondary pin towards or away of the secondary slot.

Preferably, the driving fork comprises an arm in which the third slot is formed.

Preferably, the driving rod comprises an abutment that pushes the secondary pin in the secondary slot when the driving rod is in the extreme opened position of the circuit breaker.

Preferably, when the driving rod is in a position between a closed position of the circuit breaker and said predefined position, the primary pin cooperates with the primary slot and the secondary pin is out of the secondary slot.

Preferably, when the driving rod is in a position between said predefined position and the extreme opened position of the circuit breaker, the primary pin is out of the primary slot and the secondary pin cooperates with the secondary slot.

Preferably, it comprises two parallel driving rods evenly distributed with respect to a vertical median plane of the circuit breaker.

Preferably, each pin extends parallel to secondary axis B and is connected to each driving rod.

Preferably, the linkage mechanism is designed to drive the movable contact in displacement from the beginning of an opening step of the circuit breaker until the movable contact reaches a predefined position located beyond a separation position Preferably, the movable contact remains stationary in the circuit breaker after having reached said predefined position.

DETAILED DESCRIPTION OF PARTICULAR EMBODIMENTS

Figure 1:
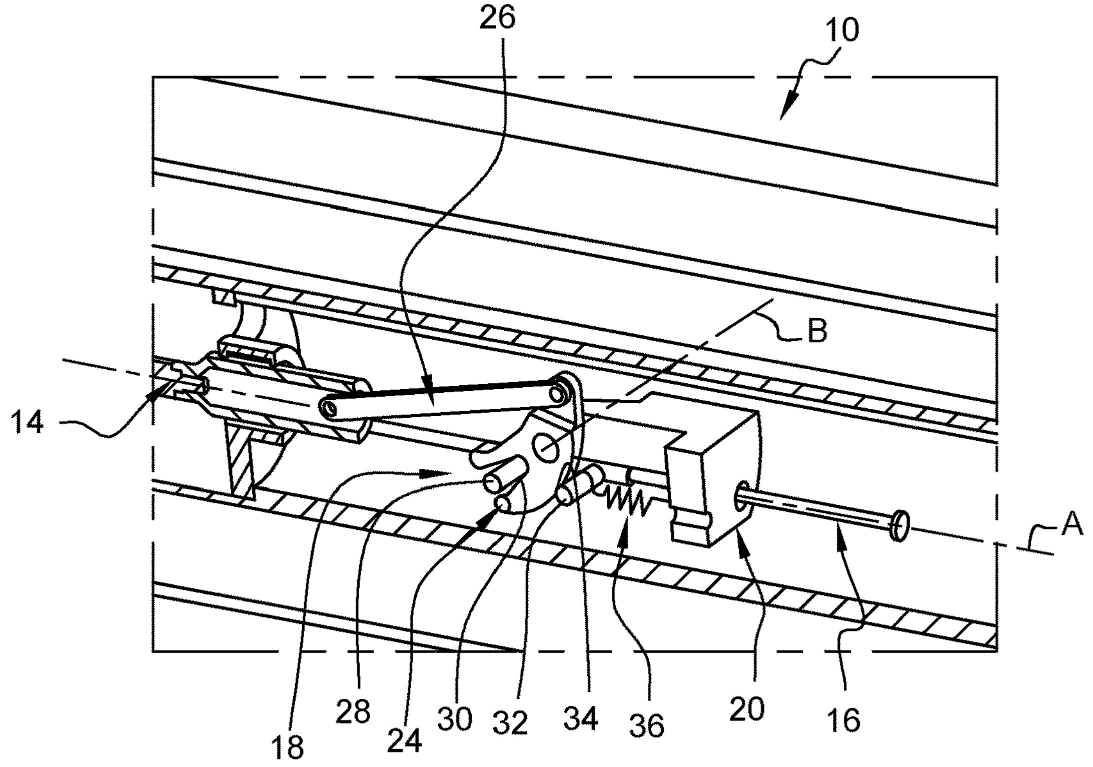
FIG. 1 is a schematic diagram of a circuit breaker comprising a linkage mechanism according to a first embodiment of the invention.

FIG. 1 represents a first embodiment of a circuit breaker 10 comprising a tulip-shaped movable contact not shown, a pin-shaped movable contact 14, two driving rods 16 and a linkage mechanism 18 connecting the pin-shaped movable contact 14 to the driving rod 16.

The pin-shaped movable contact 14 is coaxial to a main axis A of the circuit breaker and is movable along main axis A, to contact or to be separated from the tulip-shaped movable contact.

During an opening step of the circuit breaker 10, the tulip-shaped contact and the pin-shaped movable contact 14 move in opposite directions to separate from each other.

The driving rods 16 move axially simultaneously to the movement of the tulip-shaped contact.

In order to enhance the separation of the tulip-shaped contact and the pin-shaped movable contact 14, the linkage mechanism 18 is designed so that both the tulip-shaped contact and the pin-shaped movable contact 14 move axially from the beginning of the opening step.

The linkage mechanism 18 is also designed such that when the circuit breaker reaches a position corresponding to a separation of the tulip-shaped contact and the pin-shaped movable contact 14, the axial speed of the pin-shaped movable contact 14 is at its maximum.

Next, the pin-shaped movable contact 14 travels for a given distance beyond this position corresponding to the separation of the contacts, until it reaches a predefined intermediary position.

After having reached the predefined intermediary position, the opening step proceeds further, that is to say the tulip-shaped contact and the rods 16 continue to move axially, whereas the pin-shaped movable contact 14 remains stationary in the circuit breaker 10.

For clarity reason, in the foregoing description of the circuit breaker 10, the pin-shaped movable contact 14 will be referred as movable contact 14.

The driving rods 16 extend parallel to a main longitudinal axis A of the circuit breaker. In a preferred embodiment, the driving rods 16 are evenly distributed with respect to a vertical median plane (not shown) of the circuit breaker 10.

The driving rods 16 are slidably mounted in the circuit breaker 10. A holder 20, which is stationary in the circuit breaker 10, supports the linkage mechanism 18 and by which, said holder 20, the rods 16 are slidably guided in the circuit breaker 10 parallel to main axis A.

A mechanism (not shown) drives the driving rods 16 in a direction or another to open or close the circuit breaker 10.

The linkage mechanism 18 comprises a pivoted driving fork 24 which is rotatably mounted with respect to the holder 20 along a secondary axis B perpendicular to main axis A.

The movable contact 14 is linked to the driving fork 24 by a driven lever 26. The design of the driving fork 24 and of the driven lever 26 allows obtaining the maximum speed of the movable contact 14 when the circuit breaker reaches the separation position.

A first end of the driven lever 26 is articulated with the movable contact 14; the second end of the driven lever 26 is articulated to the driving fork 24.

The driving fork 24 cooperates with the driving rods 16 through a pin and slot connection, so that a translation of the driving rods 16 produces a rotation of the driving fork 24 around the secondary axis B.

A primary pin 28 extending parallel to the secondary axis B is linked to both driving rods 16 and the primary pin 28 translates integrally with the driving rods 16.

The driving fork 24 comprises a primary slot 30 with which the primary pin 28 cooperates during a closing step or an opening step of the circuit breaker 10.

The primary slot 30 is designed so that, during the translation of the driving rods 16, the primary pin 28 moves parallel to main axis A and moves in the primary slot 30.

The orientation of the primary slot 30 with respect to the secondary axis B allows the driving fork 24 to rotate around this secondary axis B while the primary pin 28 moves inside the primary slot 30.

As explained before, while referring to FIG. 1, during the opening step or the circuit breaker 10, the movable contact 14 moves axially from the left to the right, from a connected position with the tulip-shaped contact (not shown) to a disconnected position represented on FIG. 1, where the movable contact 14 is distant from the tulip-shaped contact.

During this translation of the movable contact 14, the driving fork 24 rotates clockwise around the secondary axis B.

Then, the driving rods 16 move from the right to the left during this opening step.

When the movable contact 14 reaches said predefined position in the circuit breaker, which is a position disconnected and away from the tulip-shaped contact, it does not move further, while the driving rods 16 are still translating.

To this end, when the driving rods 16 and the primary pin 28 reach a predefined position, corresponding to the predefined position of the movable contact 14, the primary pin 28 exits the primary slot of the driving fork 24, which is open at one of its ends, so that the primary pin 28 doesn't cooperate with the primary slot Then, when the driving rods 16 move past said predefined position, the primary pin 28 doesn't cooperate with the primary slot anymore, so that the movable contact 14 remains stationary, until the driving rods 16 reach a final position which we will call extreme opened position.

During a closing step of the circuit breaker 10, the driving rods 16 translate from their extreme opened position towards the closing position of the circuit breaker 10, i.e. from the left to the right on FIG. 1.

When the driving rods 16 are between the extreme opened position and the predefined position, the primary pin 28 is out of the primary slot 30. Then, at the predefined position, the primary pin 28 enters the primary slot 30 and further movement of the driving rods 16 provides a rotation of the driving fork 24 counterclockwise, driving the movable contact 14 to the left towards the tulip-shaped contact.

When the driving rods 16 are between the extreme opened position and the predefined position, the primary pin 28 is out of the primary slot 30, the primary pin 28 doesn't cooperate with the driving fork 24. The driving fork 24 can rotate in any direction, which can compromise any further movement in the circuit breaker.

For example, the movable contact 14 will move from a resting position and move closer to the tulip-shaped contact. Also, the primary pin 28 cannot be able to enter the primary slot when the driving rods 16 are in the predefined position.

To prevent any non-needed rotation of the driving fork 24, the linkage mechanism 18 comprises a secondary pin 32 linked to the driving rods 16 and which is able to cooperate with the driving fork 24, to prevent the rotation of the driving fork 24 when the driving rods 16 are in a position between the extreme opened position and the predefined position, that is when the primary pin 28 doesn't cooperate with the primary slot 30.

The driving fork 24 comprises a secondary slot 34 which receives the secondary pin 32 when the driving rods 16 are in a position between the extreme opened position and the predefined position.

When the driving rods 16 move between the extreme opened position and the predefined position, the secondary pin 32 cooperates with the secondary slot 34 and is stationary within the circuit breaker 10.

To this end, the secondary pin 32 is slidably mounted on the driving rods, to allow respective movement of the secondary pin 32 with respect to the driving rods 16, when the secondary pin 32 cooperates with the secondary slot 34.

When the driving rods 16 move between the predefined position and a position corresponding to the closed position, the secondary pin 32 is disengaged from the secondary slot 34.

This secondary pin and slot connection does not lock the driving fork 24 anymore; the driving fork 24 is then able to rotate around secondary axis B, by the cooperation of the primary pin 28 and the primary slot 30 as explained before.

As explained before, the secondary pin 32 is slidably mounted on the driving rods 16.

When the driving rods 16 move between the predefined position and the position corresponding to the closed position of the circuit breaker 10, and more particularly when they reach the predefined position, the secondary pin 32 must be located in front of the secondary slot 34, to cooperate with it when the driving rods 16 move between the predefined position and the extreme opened position.

To this end, the circuit breaker comprises elastic means that urge the secondary pin towards the driving fork 24.

In the embodiment represented in FIG. 1, the elastic means consist of a compression spring 36, one end of which is connected to the secondary pin 32, the second end of the spring 36 is connected to the holder 20.

Due to the presence of the spring 36, the secondary pin 32 is always close to the position in which it engages with the secondary slot 34.

Figure 2:
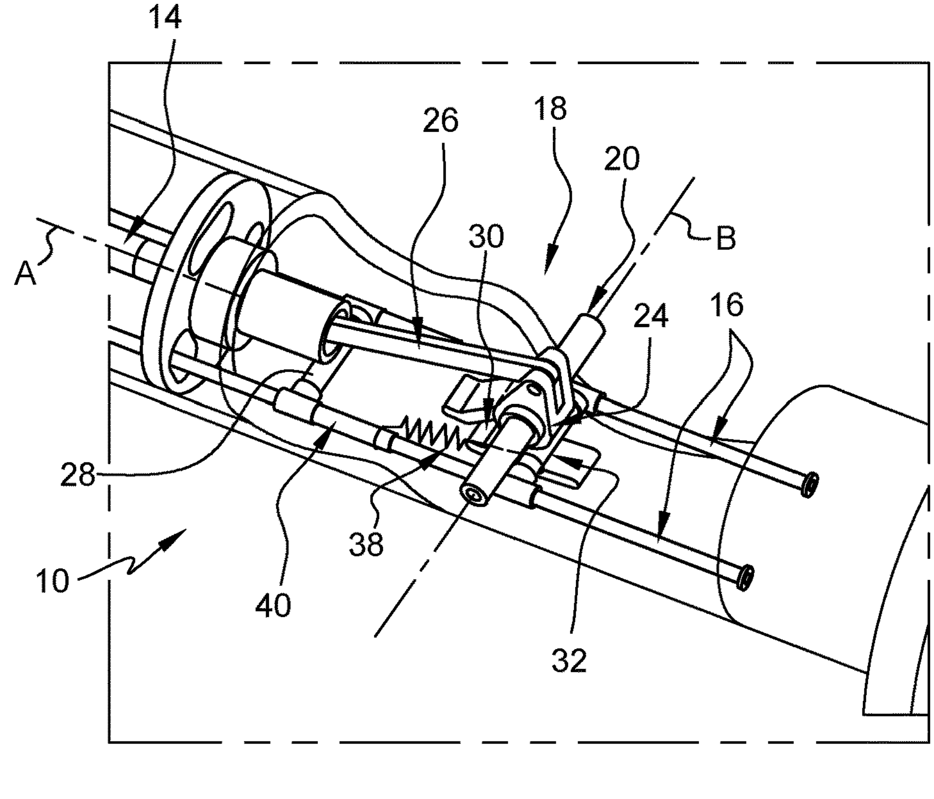
FIG. 2 is a diagram similar to FIG. 1 showing a second embodiment of the invention.

In the embodiment represented in FIG. 2, the elastic means consist of a tension spring 38, one end of which is connected to the secondary pin 32, the second end of the traction spring 38 is connected to primary pin 28.

Then, the tension spring 38 moves with the primary pin 28, with the secondary pin 32, and then with the driving rods 16.

A sleeve 40 is mounted on each driving rod 16 and is fixed to the primary pin 28, extending towards the secondary pin 32.

Figure 3:
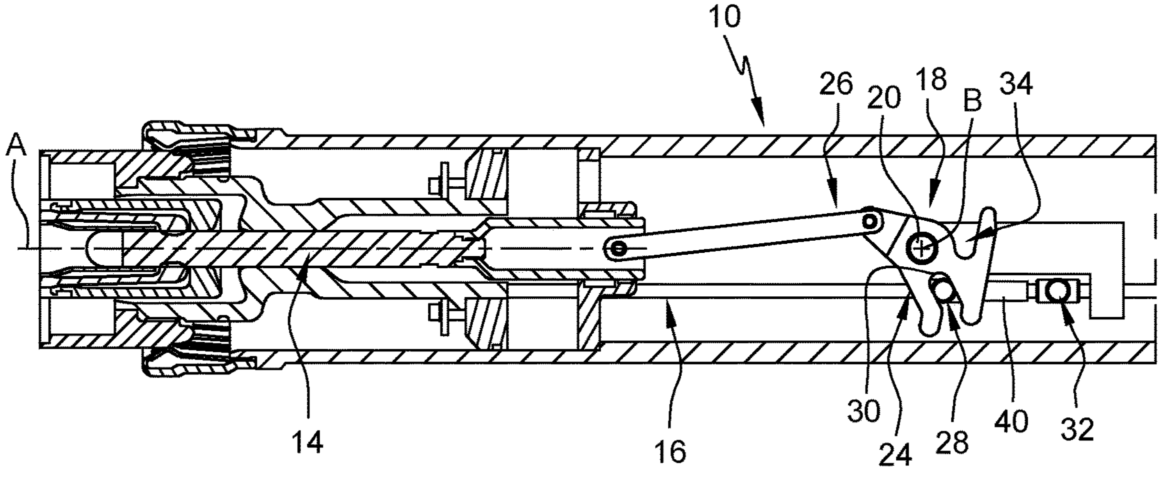
FIG. 3 is an axial section of the circuit breaker represented on FIG. 2, shown in an extreme closed position.

The sleeves 40 allow maintaining the secondary pin 32 at a set distance from the primary pin 28 when the driving rods 16 move between the predefined position and the position corresponding to the closed position of the circuit breaker 10, as can be seen on FIG. 3.

Figure 4:
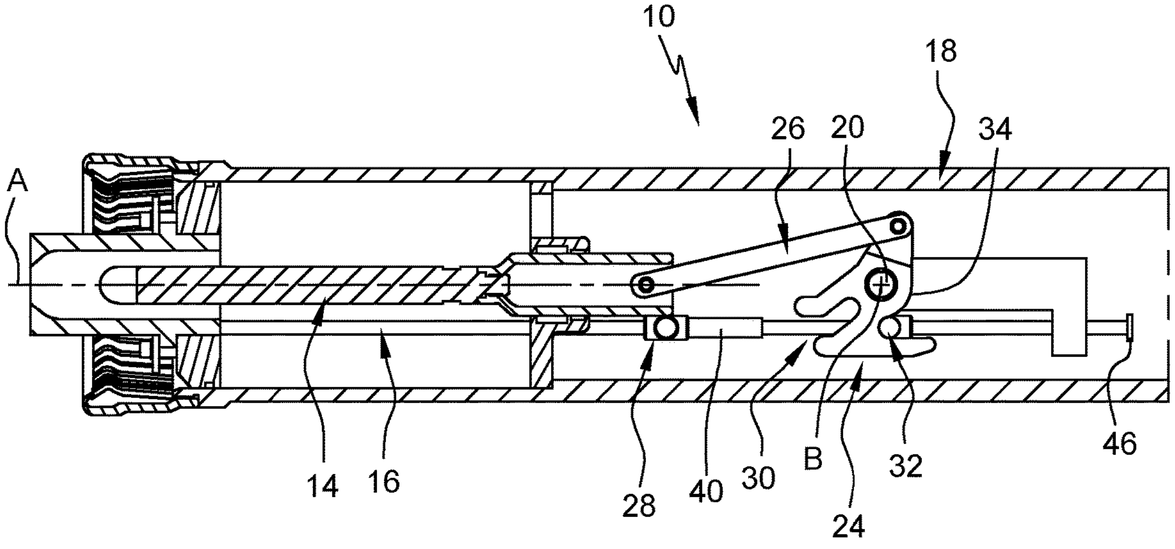
FIG. 4 is an axial section of the circuit breaker represented on FIG. 2, shown in an extreme opened position.

When the driving rods 16 move between the predefined position and the extreme opened position, as represented on FIG. 4, the secondary pin 32 is received in the secondary slot 34 and cannot move. The traction spring 38 (not visible in FIGS. 3 and 4) is then extended to maintain the secondary pin 32 in the secondary slot 34.

Figure 5:
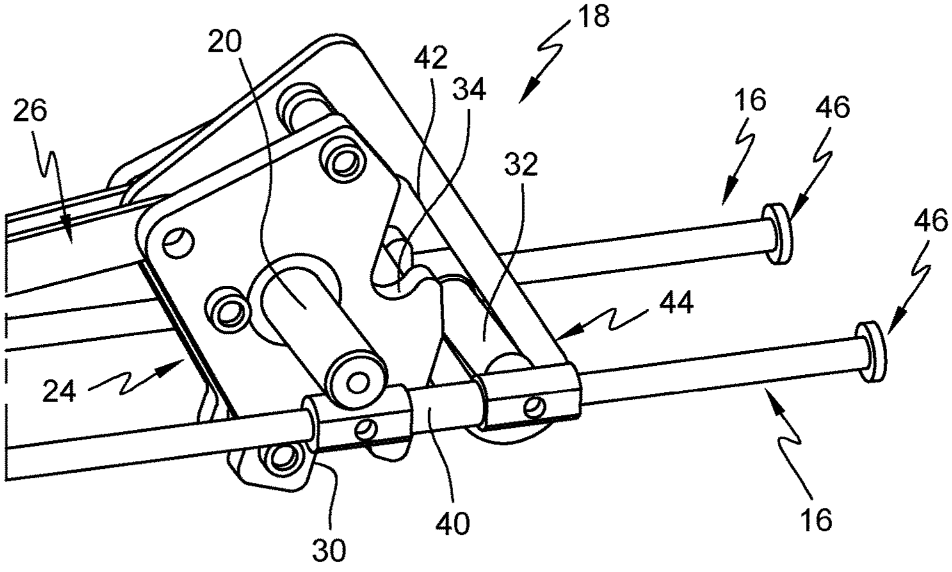
FIG. 5 is a schematic diagram of a linkage mechanism according to a third embodiment of the invention shown in an extreme closed position of the circuit breaker.
Figure 6:
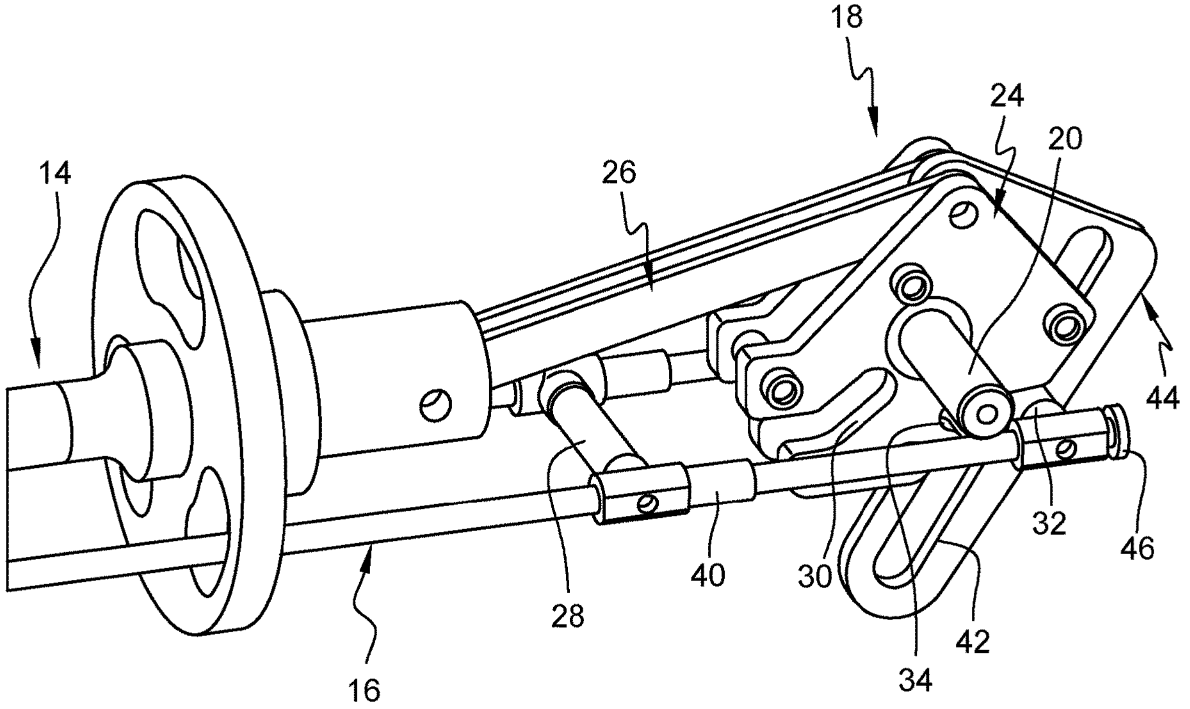
FIG. 6 is a diagram similar to FIG. 5 showing the linkage mechanism circuit breaker in an extreme opened position of the circuit breaker.

A third embodiment of the invention is represented on FIGS. 5 and 6, in which the position of the secondary pin 32 along the driving rods 16 is defined by a third slot 42 formed on an arm 44 fixed to the driving fork 24.

When the driving rods 16 move between the predefined position and the position corresponding to the closed position of the circuit breaker 10, the driving fork 24, and then the arm 44 comprising the third slot, rotates around secondary axis B.

The secondary pin 32 translates along the driving rods 16 depending of the design of the third slot 42.

When the driving rods 16 move between the predefined position and the extreme opened position, the driving fork 24 is locked in position by the secondary pin 32 cooperating with the secondary slot 34.

each driving rod 16 comprises an abutment 46 located on the rod 16 in order to lock the secondary pin 32 in position inside the secondary slot 34 when the driving rods 16 reach the extreme opened position, as can be seen in FIG. 6.

We claim:

1. A circuit breaker comprising a movable contact slidingly mounted in the circuit breaker along a main axis of the circuit breaker and comprising at least one driving rod slidably mounted in the circuit breaker along the main axis, a linkage mechanism for driving the movable contact, comprising:

a pivoted driving fork rotatably mounted in the circuit breaker along a secondary axis perpendicular to the main axis, which driving fork cooperates with the driving rod through a cooperation of a primary pin provided on the driving rod and a primary slot provided on the driving fork, a driven lever connecting the driving fork to the movable contact, wherein the driving rod supports a secondary pin which cooperates with a secondary slot of the driving fork when the driving rod is in a position between a predetermined position, in which the movable contact is disconnected from an associated contact and an extreme opened position of the circuit breaker, wherein the secondary pin is slidably mounted on the driving rod, wherein the linkage mechanism is designed to drive the movable contact in displacement from a beginning of an opening step of the circuit breaker until the movable contact reaches a predefined position located beyond a separation position, and wherein the movable contact remains stationary in the circuit breaker after having reached the predefined position.

2. The circuit breaker according to claim 1, wherein the secondary pin cooperates with an elastic component urging the secondary pin towards the driving fork.

3. The circuit breaker according to claim 2, wherein an end of the elastic component is linked to the secondary pin and an other end of the elastic component is stationary in the circuit breaker.

4. The circuit breaker according to claim 2, wherein an end of the elastic component is linked to the secondary pin and the other end of the elastic component is linked to the primary pin.

5. The circuit breaker according to claim 4, wherein a sleeve is mounted on the driving rod and is fixed to the primary pin, extending towards the secondary pin.

6. The circuit breaker according to claim 1, wherein the driving fork comprises a third slot receiving the secondary pin to move the secondary pin towards or away of the secondary slot.

7. The circuit breaker according to claim 6, wherein the driving fork comprises an arm in which the third slot is formed.

8. The circuit breaker according to claim 1, wherein the driving rod comprises an abutment that pushes the secondary pin in the secondary slot when the driving rod is in the extreme opened position of the circuit breaker.

9. The circuit breaker according to claim 1, wherein when the driving rod is in a position between a closed position of the circuit breaker and said predefined position, the primary pin cooperates with the primary slot and the secondary pin is out of the secondary slot.

10. The circuit breaker according to claim 1, wherein when the driving rod is in a position between said predefined position and the extreme opened position of the circuit breaker, the primary pin is out of the primary slot and the secondary pin cooperates with the secondary slot.

11. The circuit breaker according to claim 1, wherein the circuit breaker comprises two parallel driving rods evenly distributed with respect to a vertical median plane of the circuit breaker.

12. The circuit breaker according to claim 11, wherein each pin extends parallel to the secondary axis and is connected to each driving rod.

* * * * *